United States Patent [19]
Fukawa

[11] Patent Number: 5,890,073
[45] Date of Patent: Mar. 30, 1999

[54] MOBILE TERMINAL CAPABLE OF SENDING COMMUNICATION MODE SIGNALS AND A METHOD THEREOF

[75] Inventor: Yasurou Fukawa, Hiratuka, Japan

[73] Assignee: Any Co. Ltd., Japan

[21] Appl. No.: 684,267

[22] Filed: Jul. 17, 1996

Related U.S. Application Data

[63] Continuation of Ser. No. 329,851, Oct. 27, 1994, abandoned, which is a continuation-in-part of Ser. No. 138,262, Oct. 20, 1993, abandoned, which is a continuation of Ser. No. 716,119, Jun. 17, 1991, Pat. No. 5,293,418.

[30] Foreign Application Priority Data

| Jun. 20, 1990 | [JP] | Japan | 2-159857 |
| Apr. 16, 1991 | [JP] | Japan | 3-109651 |

[51] Int. Cl.[6] ................................................. H04O 7/20
[52] U.S. Cl. ..................... 455/557; 458/31.3; 458/403; 458/553; 458/556; 370/493
[58] Field of Search ........................... 455/31.1, 31.2, 455/31.3, 403, 422, 436, 577, 550, 575, 90, 552, 553, 556, 557; 340/825.44; 370/493–495

[56] References Cited

U.S. PATENT DOCUMENTS

| 4,823,373 | 4/1989 | Takahashi et al. | 379/58 |
| 5,040,204 | 8/1991 | Sasaki et al. | 379/57 |
| 5,117,449 | 5/1992 | Metroka et al. | 379/58 |
| 5,237,429 | 8/1993 | Zuiss et al. | 379/100 |
| 5,335,355 | 8/1994 | Tanaka et al. | 455/54.1 |
| 5,564,077 | 10/1996 | Obayashi et al. | 455/553 |

FOREIGN PATENT DOCUMENTS

| 0282930 | 11/1989 | Japan | 379/100 |
| 0097160 | 4/1990 | Japan | 379/59 |
| 0163949 | 7/1991 | Japan | 379/100 |

*Primary Examiner*—Dwayne D. Bost
*Assistant Examiner*—Nay Maung

[57] ABSTRACT

A mobile terminal communicable with a public switched network through a stationary radio station over a radio channel includes a telephone network effecting audible, telephonic conversation over the radio channel to the radio station. The mobile terminal may be set to the condition in which it is not allowed to effect the telephonic conversation to the radio station. The mobile terminal disables the telephone speech circuit thereof while it is in the condition. When the mobile terminal receives a call from the public switched network, it transmits to the public switched network the status signal representing that it is in the condition. In response to the status signal, a message meant to the mobile terminal is transmitted through the public switched network over the radio channel to the mobile terminal, and is displayed visually on the display and/or stored in the memory of the mobile terminal.

23 Claims, 6 Drawing Sheets

MOBILE TERMINAL CAPABLE OF SENDING COMMUNICATION MODE SIGNALS AND A METHOD THEREOF

This application is a continuation, of application Ser. No. 08/329,851 filed on Oct. 27, 1994, now abandoned, which is a continuation-in-part of application Ser. No. 08/138,262 filed on Oct. 20, 1993, now abandoned, which is a continuation of application Ser. No. 07/716,119 filed on Jun. 17, 1991 U.S. Pat. No. 5,293,418.

BACKGROUND OF THE INVENTION

1. Field of the Invention

The present invention relates to a telecommunications system which allows remote mobile terminal equipment to call and interchange information with each other via a public switched telephone network, paging station, radio link controller, etc. The present invention is also concerned with terminal equipment applicable to such a telecommunications system, and a method of communicating with the mobile terminal equipment through a public switched network.

2. Description of the Background Art

In one of conventional mobile telecommunications systems, a personal computer or similar information transmitting center system calls radio terminal equipment having a receiver capability only via a public switched telephone network and a radio paging station, and then sends desired information to the terminal equipment. The personal computer, for example, is installed in an office or similar facility while the terminal equipment is carried by a staffer belonging to the office. The staffer, therefore, can receive information from the office at any place outside the office. However, the problem with this system is that only the fixed center can send information, whereas such terminal equipment located outside the office cannot send information to another terminal equipment also located outside the office. In addition, only the fixed center can transmit call indication information.

Another type of conventional mobile telecommunications system allows two remote radio terminal equipment, or mobile stations, to communicate with each other via a radio base station. With this kind of system, a radio base station is connected to a public switched telephone network through a central office. A mobile station intending to send information to a remote mobile station transmits an originating call signal. In response, the radio base station designates a particular communication channel and then checks the mobile station. When the communication channel is set up, the calling mobile station sends a dial number designating a mobile station to be called. The central office sends a calling signal to the called mobile station on the basis of the dial number. Then, the called station returns an answer signal, and the base station in turn selects a communication channel. In this condition, the remote, two mobile stations can start communicating with each other over the designated communication channel. However, when a person expected to handle the called mobile station is absent or has suppressed the output of ringing, information cannot be delivered from the calling mobile station to that called mobile station despite the ringing from the calling station. Specifically, this type of conventional telecommunications system does not take account of the fact that when a calling person sends information to a called mobile station, a called person may have left the called mobile station or intentionally switched off the mobile station, or may not answer the call for one reason or another.

SUMMARY OF THE INVENTION

It is therefore an object of the present invention to provide relatively simple and miniature mobile terminal equipment which is ready to receive call indication information at all times.

In accordance with the present invention, a mobile terminal equipment communicable with a public switched network, which includes a stationary radio station for establishing a radio channel to said mobile terminal equipment and switches information including a message and audible, telephonic conversation signals to said mobile terminal equipment on the radio channel, comprises: receiving means for responding to a call over the radio channel from the stationary radio station and receiving the information and the conversation signals over the radio channel from the stationary radio station; display means for visually displaying the message included in the information received; a telephone speech circuit for transducing the received conversation signals into corresponding audible sound, and capturing voice and transducing the captured voice into corresponding conversation signals; control means for controlling said receiving means, said display means and said telephone speech circuit to cause, when said receiving means receives the information, said display means to display the message included in the received information; said control means producing a first status signal representing that said mobile terminal equipment is in a first condition in which said mobile terminal equipment is not allowed to effect audible, telephonic conversation over the radio channel to the stationary radio station; and transmitter means for transmitting the first status signal produced to the stationary radio station over the radio channel, upon receiving a call from the stationary radio station while said mobile terminal equipment is in the first condition; said control means disabling said telephone speech circuit while said mobile terminal equipment is in the first condition.

Also in accordance with the present invention, a method of communicating with mobile terminal equipment through a public switched network, which includes a stationary radio station for establishing a radio channel to the mobile terminal equipment and switches information including a message and audible, telephonic conversation signals to the mobile terminal equipment on the radio channel, the mobile terminal equipment including a telephone speech circuit effecting audible, telephonic conversation over the radio channel to the stationary radio station, comprises the steps of: setting the mobile terminal equipment to a condition in which the mobile terminal equipment is not allowed to effect the audible, telephonic conversation over the radio channel to the stationary radio station; originating a call through the public switched network and the stationary radio station over the radio channel to the mobile terminal equipment; transmitting, in response to the call originated, a status signal from the mobile terminal equipment to the stationary radio station over the radio channel, the status signal representing that the mobile terminal equipment is in the condition; disabling the telephone speech circuit of the mobile terminal equipment while the mobile terminal equipment is in the first condition; transmitting, in response to the status signal transmitted, information including a message meant to the mobile terminal equipment through the public switched network and the stationary radio station over the radio channel to the mobile terminal equipment; receiving by the mobile terminal equipment the information transmitted over the radio channel from the stationary radio station; and displaying visually on the mobile terminal equipment the message included in the information received.

In summary, in accordance with the invention, a mobile terminal communicable with a public switched network through a stationary radio station over a radio channel includes a telephone speech circuit effecting audible, telephonic conversation over the radio channel to the radio station. The mobile terminal may be set to the condition in which it is not allowed to effect the telephonic conversation to the radio station. The mobile terminal disables the telephone speech circuit thereof while it is in the condition. When the mobile terminal receives a call from the public switched network, it transmits to the public switched network the status signal representing that it is in the condition. In response to the status signal, a message meant to the mobile terminal is transmitted through the public switched network over the radio channel to the mobile terminal, and is displayed visually on the display and/or stored in the memory of the mobile terminal.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
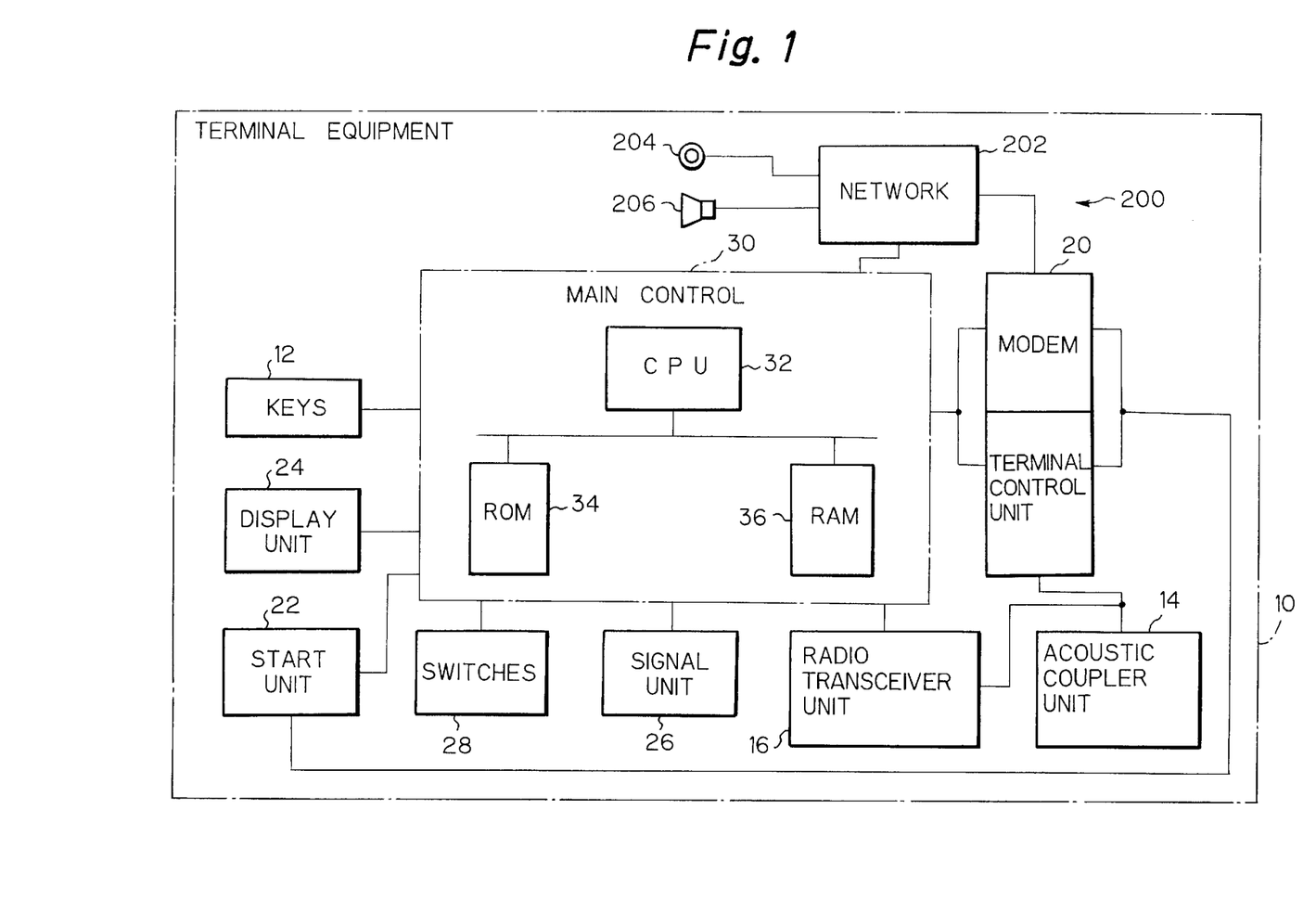
FIG. 1 is a block diagram schematically showing a preferred embodiment of the mobile terminal equipment in accordance with the present invention.

Referring to FIG. 1 of the drawings, mobile terminal equipment embodying the present invention is generally designated by the reference numeral 10. The terminal equipment 10 is adapted to receive a call from, and originate a call to, a public switched telephone network 100 or 120, FIGS. 2 and 3. As shown, the terminal equipment 10 has a plurality of keys 12, such as alphanumeric and function keys which respectively produce alphanumeric character codes and function codes. Those keys 12, forming a keyboard, may manually be operated to input information to be sent, data such as the number assigned to terminal equipment to be called, commands such as a call origination command, etc. The terminal equipment 10 is applicable or connectable to specific radio paging systems 100 and 120 shown in FIGS. 2 and 3, respectively. To this end, the terminal 10 has an acoustic coupler unit 14 and a radio transceiver unit 16.

The acoustic coupler unit 14 includes a transmitter and receiver function by acoustically connecting the terminal equipment 10 to a handset, not shown, of a telephone set 104 which is connected to a central office 102 included in the system 100. The terminal equipment 10 may be adapted for a handy acoustic coupler independent of the equipment 10, if desired. In the latter case, the terminal equipment 10 will be provided with connector terminals exclusive for connecting to an independent coupler. The transceiver unit 16 has an antenna 18, FIG. 2, for receiving electromagnetic waves emanating from a paging station 106 included in the system 100, FIG. 2, or a radio base station 126 included in the system 120, FIG. 3, and also for transmitting electromagnetic waves to system 100 or 120.

A MODEM and terminal control unit, generally 20, FIG. 1, is connected to the acoustic coupler unit 16 and transceiver unit 14. The MODEM and terminal control unit 20 serves two different functions, i.e. the function of demodulating received waves and modulating waves to be transmitted, and the function of interfacing the terminal 10 to a telephone channel for channel control. The unit 20 is connected to a start unit 22. The start unit 22 plays the role of a transmitter circuit for transmitting information and control data via the acoustic coupler 14 and transceiver 16.

The terminal equipment 10 has a display unit 24 for visually displaying thereon information entered on the keys 12 and information received from the system 100 or 120 in the form of words and/or images. The operative status of the equipment 10 is also displayed on the display unit 24 to the user of the equipment 10. Further, the terminal equipment 10 includes a signal unit 26 which includes visual and audible indicators for alerting the user of the terminal 10 to incoming calls, i.e. paging audibly and/or visibly by sound, vibration and/or light. The alerting by vibration or light may be advantageous under some circumstances, such as before the public, because it does not disturb the people other than the user holding the terminal equipment 10.

The terminal equipment 10 also includes switches 28 which are manually operable to inhibit the the signalling unit 26 from functioning, as desired, for example. More specifically, with reference to FIG. 4, the switches 28 include keys ALERT OFF, KEYBOARD and STORE, 210, 212 and 214, respectively, in the specific embodiment to form a keypad. The key ALERT OFF, 210, may be operated in order to disable the signalling unit 26 not to alert the user to incoming calls audibly. After the key ALERT OFF, 210, has been depressed, the signalling unit 26 indicates incoming calls only visually and/or by vibration. The key KEYBOARD, 212, may be depressed when the user wishes to set up a keyboard and display communication mode, in which he or she can communicate with a connected party by means of the keys 12 and the display unit 24 only, and not by an on-board, audible telephone 200, which will be described later. The remaining key STORE, 214, is operable in order for the user to set up a storage mode, in which the equipment 10 merely receives messages from calling parties and stores them into a storage, such as a RAM 36, included in a main control 30, and neither the on-board, audible telephone nor the keyboard 12 and display 24 are used for communication. That mode of communication is a one-way transmission.

Figure 4:
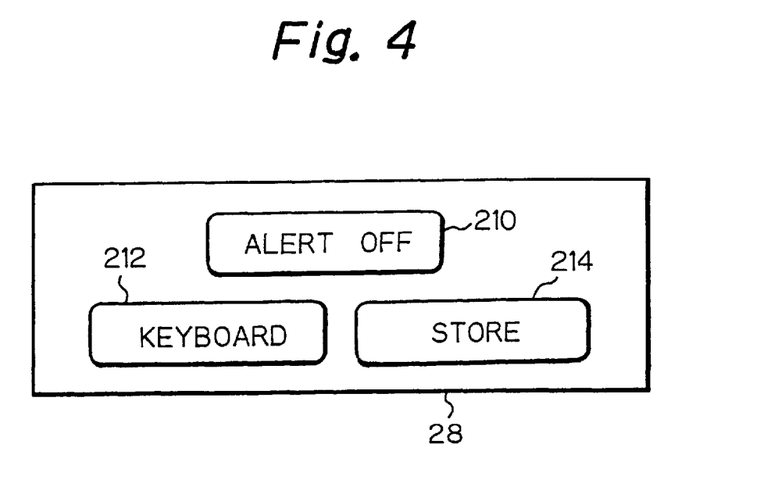
FIG. 4 shows in a plan view the switch panel of the terminal equipment shown in FIG. 1.

The switches 28, forming a keypad, may be designed to include another key which is operable when the user wishes to reset the signalling unit 26 so as to temporarily disable the signalling unit 26 from indicating incoming calls. The switches 28 may also be designed to be provided with any additional or separate key or keys which are operable solely or in combination to set up the aforementioned communication modes. Alternatively, the terminal 10 may be adapted to set up those communitation modes by operating the function keys of the keyboard 12 to enter specific commands. In addition, the keys 210, 212 and 214 may be of the machanically lockable type and/or include an indicator lamp or light-emitting diode (LED) which can be lit for confirmation when a depression of the corresponding key is detected by and memorized by the main control 30.

The main control 30, incorporated in the terminal 10, is adapted for controlling the various functioning blocks of the terminal 10 stated above. The terminal equipment 10 is provided with three communication modes, as described above: the usual audible, telephonic conversation mode, the keyboard and display conversation or both-way communication mode, and the storage transmission or one-way transmission mode. Those three communication modes are established under the control of the main control 30. The main control 30 is advantageously made up of a central processor unit (CPU) 32, a ROM 34 and a RAM 36 which are interconnected as illustrated so as to implement the control over the entire terminal equipment 10. The ROM 34 stores therein operation program sequences to be executed by the main control 30 and various kinds of fixed data. The RAM 36 serves as a temporary storage and is also used as working areas. Specifically, the RAM 36 includes a storage area in which temporarily stored are various kinds of information involved in communications, such as communication information and paging indication information received from the system 100 as well as information entered on the keys 12 to be sent to the system 100.

In order to enable the user to communicate with a destinated party on the basis of audible or telephonic conversation, in addition to data transmission, the terminal equipment 10 is comprised of an on-board telephone set 200, FIG. 1, which includes a telephone network 202, and a microphone 204 and earphone 206. The microphone 204 is adapted to capture sound generated by the user to transduce the sound to electric signals to the telephone network 202, and the earphone 206 is adapted to transduce conversation signals provided from the network 202 to audible sound to the user. The microphone 204 and the earphone 206 may be in the form of an independent handset. The telephone network 202 is ordinary telephonic circuitry including the speech path conveying conversation signals, and the detection and control circuits, such as a ringing detector and a switch hook, which are required for controlling the subscriber line signals under the control of the main control 30 and interfacing with the MODEM and terminal control unit 20. Where the terminal equipment 10 is designed to function as paging only, the on-board telephone circuitry 200, including the telephone network 202, microphone 204 and earphone 206, may be omitted.

Figure 2:
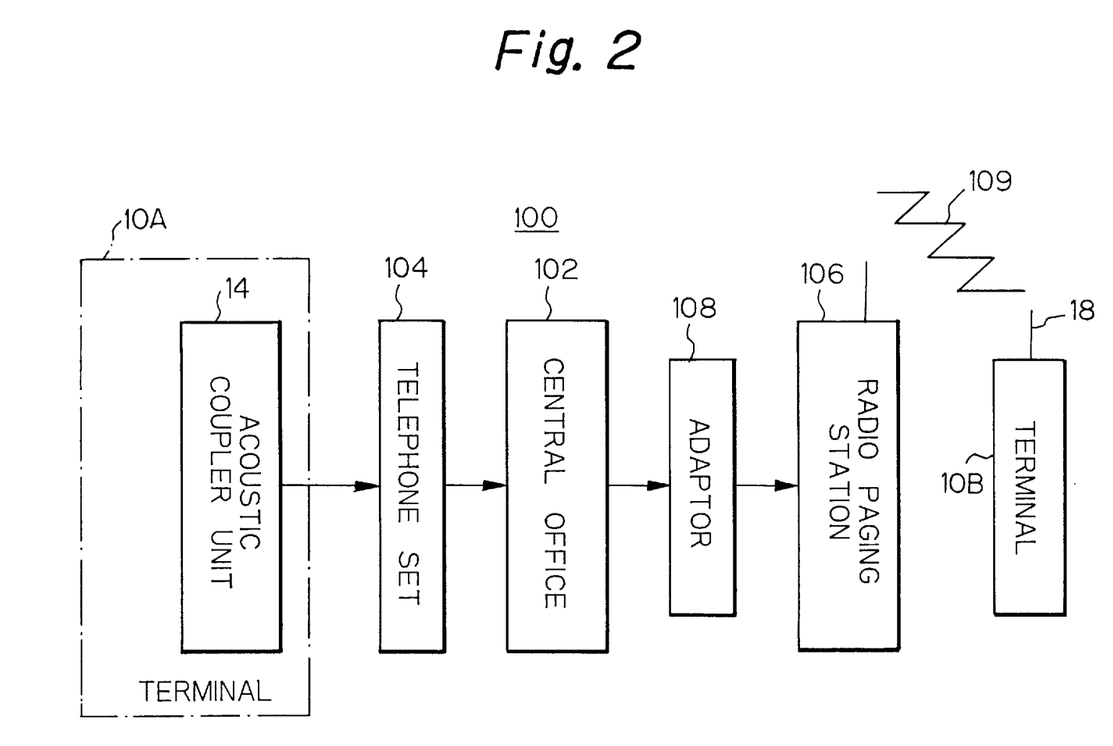
FIG. 2 schematically shows an embodiment of a radio paging system applicable to the terminal equipment shown in FIG. 1.

Referring to FIG. 2, there are shown two terminals 10A and 10B, each of which are identical in structure with the terminal equipment 10, FIG. 1. One terminal equipment 10A is connected to the central office or offices 102 by an acoustic coupler 14 thereof and the telephone set 104, which is interconnected to the central office 102 by a subscriber line 103. The other terminal equipment 10B is connected to the radio paging station 106 by its radio transceiver unit 16, FIG. 1, via electromagnetic waves 109. The central office 102 may be implemented as a central office of a public switched telephone network by way of example. The paging station 106 is connected to the central office 102 via an adapter 108. The paging station 106, which is a fixed station, pages the terminal equipment 10B in response to an identification (ID) number or code assigned to the other terminal 10B and received from the central office 102, sets up a communication channel to the terminal equipment 10, and then transmits communication information to the equipment 10B.

In operation, the user of the terminal equipment 10A inputs on the keys 12 desired information meant for the remote terminal equipment 10B together with the ID number or code assigned to the objective equipment 10B, while watching the display unit 24 for confirmation. The information and the ID number or code are written into the RAM 36 under the control of the CPU 32. While any desired number of letters, characters and numerals may be entered on the keys 12, it should preferably in the illustrative embodiment be limited up to about forty, which can be accommodated on one line dealt with by a personal computer or similar data center.

Subsequently, the terminal equipment 10A is connected to the public switched telephone network via the acoustic coupler unit 14 and the telephone set 104 located near the equipment 10A. When the terminal equipment 10A calls the central office 102, it is in turn connected to the paging station 106 via the adapter 108. Then, the information having been stored in the RAM 23 is sent to the paging station 106. It is to be noted that this information includes the ID number or code assigned to the called terminal equipment 10B. Upon receiving the information from the terminal equipment 10A, the paging station 106 once returns it to the calling terminal equipment 10A for confirmation purpose. Thereafter, the paging station 106 sends the information received from the calling mobile station 10A to the called mobile station 10B on the basis of the ID number or code included in the information.

The called terminal equipment 10B receives the information from the paging station 106 by the transceiver unit 10 and writes it into the RAM 36. At the same time, the display unit 24 of the called station 10B displays the received information while the signal unit 26 alerts the user to the incoming call by sound, vibration and/or flashing light. The user may interrupt the sound, vibration and/or light being generated by the signal unit 26 by operating the key, such as ALERT OFF, or another, similar function key, of the switches 28. Since the information received from the paging station 106 is stored in the RAM 36, the user can read out the information from the RAM 36 and display it on the display unit 24 any time after having intentionally disabled the alerting indication by operating the key of the switches 28. The terminal equipment 10 is capable of storing a plurality of such incoming calls in the RAM 36 and, therefore, allows the user thereof to read out the contents of the RAM 36 and either preserve or erase them, as desired.

Figure 3:
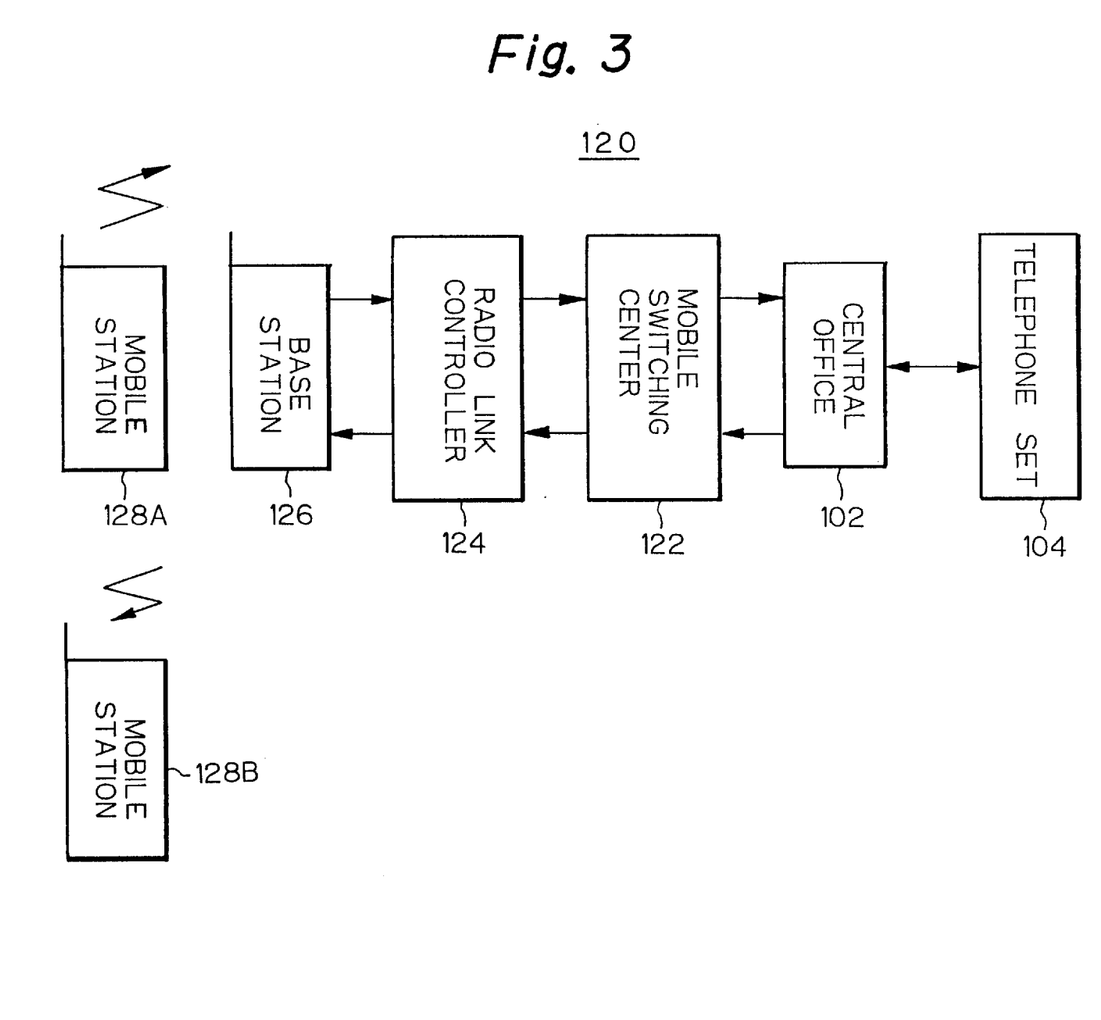
FIG. 3 schematically shows an alternative embodiment of the radio paging system applicable to the terminal equipment.

FIG. 3 shows an alternative radio paging system 120 to which the terminal equipment 10 is also applicable. As shown, the central office 102 accommodates a mobile radio communications system therein. The mobile radio communications system is made up of a mobile switching center 122, a radio link controller 124, and a radio base station 126 which are connected together, as illustrated. Although the system includes in practice many other stations, controllers and offices, only one set of those elements is shown for simplicity. In the illustrative embodiment, the radio base station 126 is communicable with mobile stations 128A and 128B. The mobile stations 128A and 128B are identical in structure with each other. Each of the mobile stations 128A and 128B includes the terminal equipment 10 which is comprised of the on-board telephone 200, FIG. 1, communicable with the base station 126. The on-board telephone set 200 includes the telephone network 202, the microphone 204 and earphone 206, as described before. Of course, the mobile stations 128A and 128B each may be constructed to communicate with one of two radio base stations which are equivalent to the radio base station 126 and independent of each other. The system 120 allows the two mobile stations 128A and 128B to call and communicate with each other via the base station 126.

Figure 5:
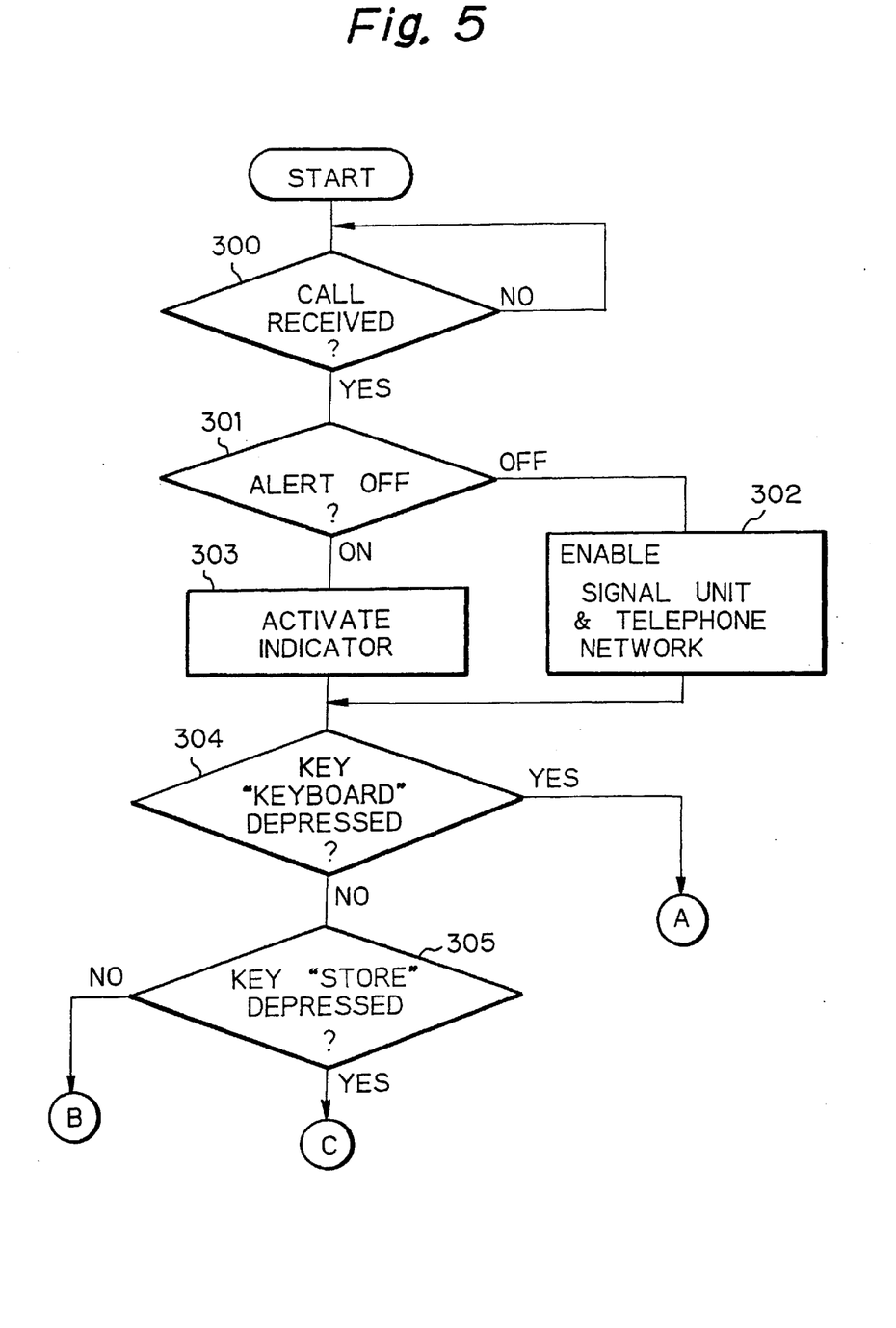
FIGS. 5, 6, 7 and 8 are flow charts demonstrating the operations of the terminal equipment shown in FIG. 1 when having received an incoming call from the base station shown in FIG. 3.

More specifically, when one of the mobile station 128A calls the remote mobile station 128B, the system 120 allows the person at the called station 128B to answer by operating the on-board telephone 200 of the station 128B. With reference to FIG. 5, upon detecting an incoming call from the base station 126, at step 300, the main control 30 of the called mobile station 128B checks the status of the key ALERT OFF, 210, at step 301. If the key ALERT OFF, 210, has not been depressed, then the main control 30 enables the signalling unit 26 and the telephone network 202 so as to allow the user to be alerted of the incoming call and talk with the calling party by voice by means of the microphone 204 and the earphone 206 (step 302). The sequences then go to step 304. Therefore, the persons at the mobile stations 128A and 128B can communicate with each other by voice on the individual on-board telephones 200.

Assume that the person at the called station 128B does not wish to perform any answering operation over a predetermined period of time, or to set up a non-answerable condition by entering a specific command on the keyboard 12 or depressing the key ALERT OFF, 210, of the switches 28. Then, the mobile station 128B transmits any of the status signals representative of "NO ANSWER" status in response to incoming calls, or may generate continuously so long as it is normally powered. More specifically with reference to FIG. 5, when the main control 30 detects the key ALERT OFF, 210, depressed at step 301, it actuates the corresponding indicator on that key 210 or the display unit 24, and disables the microphone 204 and the earphone 206 as well as part of network 202 associated therewith (step 303).

Figure 6:
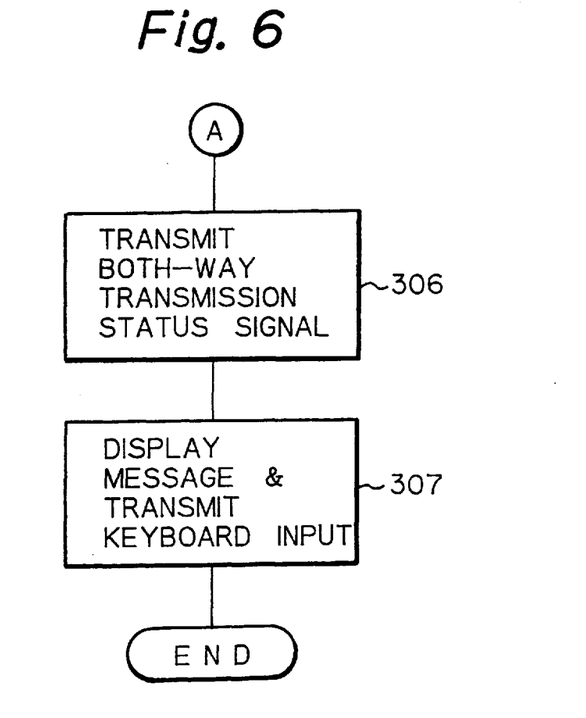

Next, the main control checks the status of the key KEYBOARD, 212, at step 304. Should the key KEYBOARD, 212, have been depressed, then the control is transferred to step 306, FIG. 6, through the connection mark A so as to transmit the status signal representative of the both-way transmission mode now available by means of the keyboard 12 and the display unit 24. That status signal is transferred to the calling mobile station 128A via the base station 126.

Upon receiving the status signal, the calling mobile station 128A indicates the status of the called terminal 128B on the display unit 24 on the basis of the status signal. The operator of the calling mobile station 128A then operates the switches 28 to set the keyboard communication mode in the station 128A. Then, he or she operates the keys 12 of the calling mobile station 128A to input the number or code designating the called mobile station 128B and the information to be destined to the called station 128B. More specifically, an arrangement may preferably be made such that the person at the calling mobile station 128A operates the keys 12 to store desired information and an ID number or code meant for the called station into the RAM 36 while confirming them on the display unit 24, and the start unit 22 reads out the information and ID number or code from the RAM 36 and transmits them over a radio channel, upon receiving the previously mentioned status signal.

The number and the information thus inputted is in turn transmitted from the calling station 128A to the radio link control 124 over a radio channel. In response, the radio link controller 124 transfers the received information to the mobile station 128B designated by the received number over a radio channel. Then, the called mobile station 128B displays it on the display unit 24 on a real time basis.

While receiving the information transmitted from the calling terminal 128A, which in turn displays the information on the display unit 24, the user of the called terminal 128B can enter information to be transmitted on the keyboard 12. Both-way conversation will thus be established between the calling and called mobile stations 128A and 128B. Preferably, the information thus transmitted to the called terminal equipment 128B may be stored into the RAM 36 of the latter.

Figure 7:
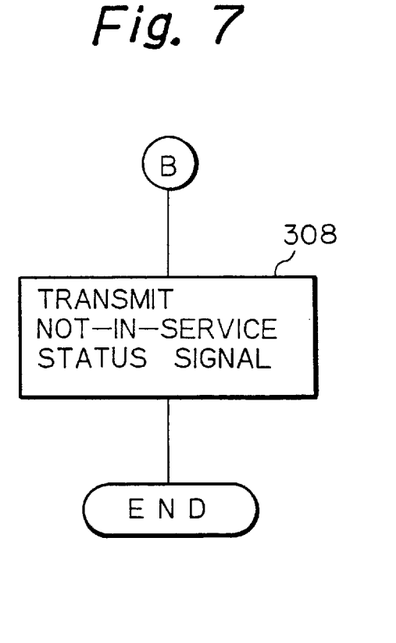

Now, returning to step 304, FIG. 5, if the key KEYBOARD, 212, has not been depressed, however, then the main control 30 further checks the operation status of the key STORE, 214, at step 305. When the key STORE, 214, has not been depressed, then the main control generates and transmits the status signal representing NOT-IN-SERVICE to the base station 126, at step 308, FIG. 7, via the connection mark B. The latter status signal represents the status of "NO ANSWER" from the mobile station 128B.

That status signal is also transferred to the calling mobile station 128A by way of the base station 126, as described in connection with the both-way transmission mode using the keyboard 12 and the display unit 24. The status signal is then sent to the calling mobile station 128A, of which the operator will abandon the calling by manipulating the switches 28 to cause the public switched network 120 to release the line connection train.

Figure 8:
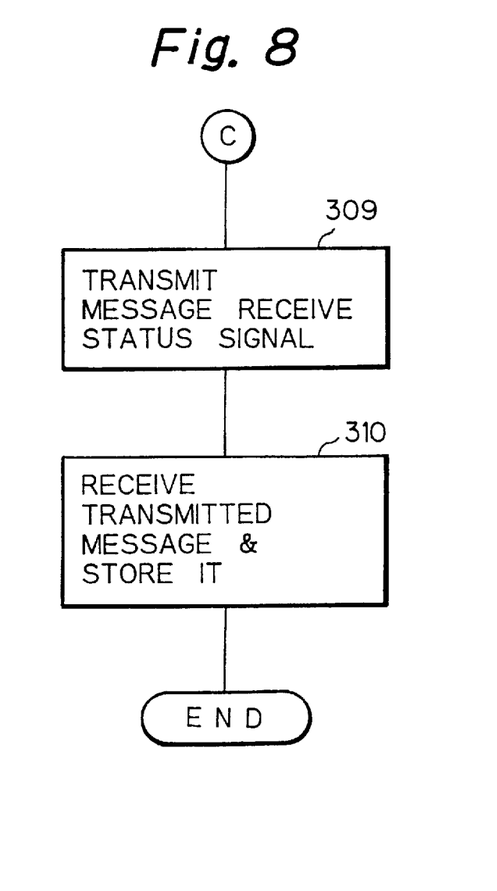

Also at step 305, FIG. 5, if the main control 30 determines when the key STORE 214 has been depressed, then it transfers the control sequences to step 309, FIG. 8, at which the status signal representing that the called terminal 128B can only receive messages to store them in RAM 36, and not transmit ones therefrom. The main control 30 of the called terminal 128B is now ready to receive messages transmitted and store them into the RAM 36, as shown at step 310.

That status signal is transferred to the calling mobile station 128A through the base station 126 in a corresponding way described in connection with the keyboard and display communication mode. On receiving the status signal, the calling mobile station 128A sends the information and the number designating the called mobile station 128B to the radio link controller 124 over a radio channel. In response, the received information is transferred to the called mobile station 128, and in the called mobile station 128B it will be written into the RAM 36 of the terminal equipment 10 thereof. The thus received information may also be displayed on the display unit 24 afterwards in response to an operation of the switches 28. The terminal equipment 10 may be adapted to read out the received information stored in the RAM 36 to transfer it to a memory card detachably connectable to the terminal 10.

In summary, it will be seen that the present invention provides a terminal equipment transmission and reception system which allows terminal equipment to call remote terminal equipment via a public switched telephone network and a radio paging station or a radio link controller, and to transmit desired information to the remote equipment. Hence, one terminal equipment can call and send information to another terminal equipment any time at any place. For example, the user of terminal equipment can send information directly to a fixed center located at an office from the place where the user is.

With the illustrative embodiments described above, non-vocal communication is established by using the display unit 24 and the storage device such as RAM 36 of the mobile terminal equipment 10. That feature is advantageously applicable to the situations in which usual, audible or telephonic conversation is not permitted or at least not preferable, for example before the public, but conversation on the basis of visual information, such as letters, characters or images, may be established. Under those circumstances, the operator of the mobile terminal 10 may manipulate the switches 28 or keys 12, such as the key ALERT OFF, 210, to switch off audible alerting of incoming calls so that non-audible alerting, such as of visual and/or vibrating, is effected. Also, he or she may set the mobile terminal 10 to its non-audible information or character transmission mode by manipulating the switches 28 or keys 12, such as the key KEYBOARD or STORE, 212 or 214.

In the latter mode of operation, in response to an incoming call terminated and received from the public switched telephone network 120, the mobile terminal 10 transmits the status signal indicative of its non-audible information or character transmission mode of operation to the public switched network, which will in turn forward the status signal to the calling party of that incoming call, which may be another mobile terminal like the terminal equipment 10 or other types of telephone subscriber set interconnected by wire or wirelessly to the public switched network. The calling terminal is adapted to indicate the status signal in the form of visual and/or audible indication notifying the calling person of the non-audible information or character transmission mode of operation allowed to the called terminal 10. The calling person may send and receive information in the form of visual information, such as letters, characters and/or images, by means of the keyboard and the display device of the terminal.

The non-audible information transmission, in the form of visual information, such as letters, characters or images, may be of a both-way transmission or conversation mode, like in a usual telephonic conversation. For example, while the operator enters character data on the keyboard or other input devices, such as a touch and display screen, a pen and display panel or a tablet, the calling terminal may receive visual information through the public switched network 120 from the called mobile terminal 10 to store it into the storage device, such as RAM 36. The transmitted and received data may be read out from the storage device, and displayed and scrolled on its display unit as desired by means of the keys. Of course, the called mobile terminal 10 is also adapted to transmit and receive information in the same way. Those features of the mobile transmission system will reduce the time lag which would otherwise be caused by key operation, and increase flexibility of communication.

In the illustrative embodiments described above, the terminal equipment 10 is applicable to transmission by means of the keyboard 12 and the display unit 24 with the status signal transmitted to the public switched network 120 to enable calling parties to converse on the basis of non-audible information.

The terminal equipment 10 may be set by operating the switches 28 or keys 12 to the state in which neither the usual telephonic transmission nor the non-audible information transmission are allowed. In the latter state, the mobile terminal 10 is merely responsive to incoming calls to display an indication such as a mark representing call incoming without generating audible alert, and even visual or vibrant alert as the case may be. The mobile terminal 10 is also settable to its storage mode in which messages included in incoming calls received from the switched network are stored into the RAM 36 thereof, and records of the incoming calls are displayed on the display unit 24. The storage mode is set by means of the key STORE, 214, of the switches 28.

Upon receiving a call from the public switched network 120, in the storage mode, the mobile terminal 10 transmits to the network 120 the status signal representative of the storage mode of the terminal 10. The status signal is received through the switched network 120 to the calling terminal to notify the calling person of the storage mode of the called terminal 10. The calling person, knowing that the called party is not responsive in the conversation mode but the storage mode, only forwards character information meant to the called party. That transmission is a one-way transmission from the calling to the called party. The called terminal 10 is responsive to the character information thus sent to receive and store it into the RAM 36, and to indicate a record of the reception of that incoming call on the display unit 24. The displayed record may include the number, and the date and time of incoming calls received during the storage mode. The operator of the called mobile terminal 10 can afterword read the character information thus stored in the RAM 36 on the display unit 24, and erase it from the RAM 36 and/or transfer it to an external storage device, such as an IC memory card, as desired.

The storage mode of the terminal equipment 10 may be utilized in all situations, even including the telephonic conversation mode, in which calling parties can send messages meant to called parties to be stored into the RAM 36 of the called terminal 10. That feature also enables, in addition to the features of the conventional mobile telephones, the message transmission system to be established in which messages can be transmitted between mobile terminals 10 with specific identification Nos., or codes alloted thereto in advance, and the transmitted messages are stored into the RAM 36 of the called terminal. This can also establish the service of broadcasting message to a plurality of mobile terminals 10 in addition to telephonic communication.

In summary, the terminal equipment in accordance with the present invention has a RAM for storing therein information having been received thereby. The stored information can be displayed on a display unit provided on the terminal equipment or held for a desired period of time, as the case may be. Even when the user of the terminal equipment intentionally interrupts sound, vibration and/or flashing light which a signal unit generates t o alert the user to a call incoming from a radio paging station, the call incoming is not disturbed at all.

Further in accordance with the invention, the user of terminal equipment can disable the signalling unit, when desired, so as not to alert him or her of incoming calls. In addition, the user may select how to repsond to incoming calls while the alerting function is disabled. The user of the called terminal equipment is able to communicate with a calling party by the keyboard and display unit of the terminal. Also the user may select the communication mode of merely storing received information into the RAM 36. Those selective communication modes permit the user to communicate with out disturbing people around him or her, and the terminal equipment in accordance with the invention is thus advantageously applicable to use before the public.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention. For example, in the illustrative embodiments, the terminal equipment 10A calls the central station 102 via the acoustic coupler unit 14, and the call is terminated at the terminal equipment 10B from paging station 106 over a radio channel. Further, the calling mobile station 128A calls the central office 106 over a radio channel, and the call is terminated at the mobile station 128B over a radio channel. Alternatively, the terminal equipment 10 and the central office 102 may be linked by either a radio channel or a wire for both of call origination and call termination. If desired, the interconnection of the central office 102 with the terminal equipment 10 may be implemented by a metallic line in place of the acoustic coupler 14.

What is claimed is:

1. Mobile terminal equipment communicable with a public switched network, which includes a stationary radio station for establishing a radio channel to said mobile terminal equipment and switches information including signals representing discrete alphanumeric character codes, said signals not including signals representing bit map data, and audible telephonic conversation signals to said mobile terminal equipment on the radio channel, comprising:

receiving means for responding to a call over the radio channel from the stationary radio station and receiving the discrete alphanumeric character codes included in the information, and the conversation signals, over the radio channel from the stationary radio station;

display means for visually displaying the alphanumeric characters included in the information received;

a telephone speech circuit for transducing the received conversation signals into corresponding audible sound, and capturing voice and transducing the captured voice into corresponding conversation signals;

first input means manually operable for setting a first condition in which said mobile terminal equipment is not allowed to effect audible, telephonic conversation over the radio channel to the stationary radio station;

control means operative in response to said first input means for controlling said receiving means, said display means and said telephone speech circuit to cause, when said receiving means receives the information, said display means to display respective alphanumeric characters represented by corresponding ones of the discrete alphanumeric character codes included in the received information, said control means producing a first status signal when said mobile terminal equipment is set to the first condition; and transmitter means for transmitting the first status signal produced to the stationary radio station over the radio channel, upon receiving a call from the stationary radio station while said mobile terminal equipment is in the first condition;

said control means disabling said telephone speech circuit while said mobile terminal equipment is in the first condition.

2. Mobile terminal equipment in accordance with claim 1, further comprising storing means for storing the information received;

said control means controlling said storing means to cause, when said receiving means receives the information, said storing means to store the information.

3. Mobile terminal equipment in accordance with claim 1, further comprising storing means for storing the information received;

said first input means being adapted to set a second condition in which said mobile terminal equipment is not allowed to effect audible, telephonic conversation over the radio channel to the stationary radio station but to store the discrete alphanumeric character codes included in the received information into said storing means;

said control means being responsive to the second condition set by said first input means to produce a second status signal and control said storing means to cause, when said receiving means receives the information, said storing means to store the alphanumeric character codes included in the information;

said transmitter means transmitting the second status signal produced to the stationary radio station over the radio channel, upon receiving a call from the stationary radio station while said mobile terminal equipment is in the second condition;

said control means disabling said telephone speech circuit while said mobile terminal equipment is in the second condition.

4. Mobile terminal equipment communicable with a public switched network, which includes a stationary radio station for establishing a radio channel to said mobile terminal equipment and switches information including signals representing discrete alphanumeric character codes, said signals not including signals representing bit map data, and audible telephonic conversation signals to said mobile terminal equipment on the radio channel, comprising:

a receiver circuit for responding to a call over the radio channel from the stationary radio station and receiving the discrete alphanumeric character codes included in the information, and the conversation signals, over the radio channel from the stationary radio station;

a display device for visually displaying alphanumeric characters included in the information received;

a telephone speech circuit for transducing the received conversation signals into corresponding audible sound, and capturing voice and transducing the captured voice into corresponding conversation signals;

an input device manually operable for setting a condition in which said mobile terminal equipment is not allowed to effect audible, telephonic conversation over the radio channel to the stationary radio station;

a control circuit operative in response to said input device for controlling said receiver circuit, said display device and said telephone speech circuit to cause, when said receiver circuit receives the information, said display device to display alphanumeric characters represented by respective ones of the alphanumeric character codes included in the received information;

said control circuit producing a status signal when said mobile terminal equipment is set to the condition; and a transmitter circuit for transmitting the status signal produced to the stationary radio station over the radio channel, upon receiving a call from the stationary radio station while said mobile terminal equipment is in the condition;

said control circuit disabling said telephone speech circuit while said mobile terminal equipment is in the condition.

5. Mobile terminal equipment in accordance with claim 4, further comprising a memory for storing the information received;

said control circuit controlling said memory to cause, when said receiver circuit receives the information, said memory to store the information.

6. A method of communicating with mobile terminal equipment through a public switched network, which includes a stationary radio station for establishing a radio channel to the mobile terminal equipment and switches information including signals representing discrete alphanumeric character codes, said signals not including signals representing bit map data, and audible telephonic conversation signals to the mobile terminal equipment on the radio channel, the mobile terminal equipment including a telephone speech circuit effecting audible, telephonic conversation over the radio channel to the stationary radio station, comprising the steps of:

manually setting the mobile terminal equipment to a first condition in which the mobile terminal equipment is not allowed to effect the audible, telephonic conversation over the radio channel to the stationary radio station;

originating a call through the public switched network and the stationary radio station over the radio channel to the mobile terminal equipment;

transmitting, in response to the call originated, a first status signal from the mobile terminal equipment to the stationary radio station over the radio channel when the mobile terminal is set in the first condition, the first status signal representing that the mobile terminal equipment is in the first condition;

disabling th e telephone speech circuit of the mobile terminal equipment while the mobile terminal equipment is in the first condition;

transmitting, in response to the first status signal transmitted, information including individual alphanumeric character codes meant to the mobile terminal equipment through the public switched network and the stationary radio station over the radio channel to the mobile terminal equipment;

receiving by the mobile terminal equipment the individual alphanumeric character codes included in the information transmitted over the radio channel from the stationary radio station; and     displaying visually on the mobile terminal equipment the individual alphanumeric characters represented by respective ones of the alphanumeric character codes included in the information received.

7. A method in accordance with claim 6, further comprising the steps of:

manually entering into the mobile terminal equipment alphanumeric character codes to be transmitted to the public switched network;

setting the mobile terminal equipment to a second condition in which the mobile terminal equipment is not allowed to effect audible, telephonic conversation but to transmit the information entered over the radio channel to the stationary radio station;

transmitting the entered alphanumeric character codes through the stationary radio station over the radio channel to the public switched network;

transmitting a second status signal, upon receiving a call from the stationary radio station of the public switched network while the mobile terminal equipment is in the second condition; and     disabling said telephone speech circuit while said mobile terminal equipment is in the second condition.

8. A terminal for communicating over a communication network, comprising:

communication circuitry, for permitting bidirectional communication with the communication network;

a data input unit for manually inputting data into the terminal; and     switching means for permitting a terminal user to select between first and second modes of operation upon establishment of a communication connection, the first mode enabling voice communication over said communication circuitry, the second mode enabling only non-vocal data communication over said communication circuitry, the non-vocal data communicated in the second mode including the manually input data from said data input unit;

said data input unit including a keyboard for entering discrete alphanumeric characters, the non-vocal data communicated in the second mode of operation including discrete alphanumeric characters entered on said keyboard.

9. The terminal of claims 8 or 6, wherein the second mode of operation is a one-way reception mode, said terminal further comprising:

a memory for storing non-vocal data received in the second mode over said communication circuitry; and     a display for displaying data from said memory.

10. The terminal of claim 9, wherein said switching means further permits selection of a third mode of operation, the third mode enabling two-way transmission/reception of non-vocal data over said communication circuitry.

11. The terminal of claim 9, wherein, upon receipt of a call from the communication network, said communication circuitry transmits a mode indication signal to the communication network when said switching means indicates the second mode of operation.

12. The terminal of claims 8 or 11, wherein the second mode of operation is a two-way transmission/reception mode, said terminal further comprising:

memory means for storing non-vocal data received in the second mode over said communication circuitry.

13. The terminal of claim 12, wherein said memory means stores non-vocal data to be transmitted from said terminal to the communication network, the non-vocal data being entered by the terminal user on said data input unit.

14. The terminal of claim 12, wherein said switching means further permits user selection of a third mode of operation, the third mode enabling only one-way reception of non-vocal data over said communication circuitry.

15. The terminal of claim 14, wherein, upon receipt of a call from the communication network, said communication circuitry transmits a first or a second mode indication signal to the communication network when said switching means indicates the second or third mode of operation, respectively.

16. The terminal of claims 8 or 6, further comprising:

alerting means for alerting the terminal user of an incoming call, said alerting means being disabled in the second mode of operation.

17. The terminal of claims 8 or 6, wherein said communication circuitry may receive a mode indication signal from the communication network indicating that a called terminal is in the second mode of operation, said terminal further comprising:

indication means for indicating the mode of operation of the called terminal.

18. The terminal of claim 8, wherein said switching means includes a manual switch.

19. A terminal for communicating over a communication network, comprising:

communication circuitry, for permitting bidirectional communication with the communication network;

a data input unit for manually inputting data into the terminal; and     switching means for permitting a terminal user to select between first and second modes of operation upon establishment of a communication connection, the first mode enabling voice communication over said communication circuitry, the second mode enabling only non-vocal data communication over said communication circuitry, the non-vocal data communicated in the second mode including the manually input data from said data input unit;

wherein, upon receipt of a call from the communication network, said communication circuitry transmits a mode indication signal to the communication network when said switching means indicates the second mode of operation.

20. The terminal of claim 19, wherein said data input unit includes a keyboard for entering discrete alphanumeric characters, the non-vocal data communicated in the second mode of operation including discrete alphanumeric characters entered on said keyboard.

21. The terminal of claims 8, 18, 19 or 20, wherein the terminal is a mobile terminal and wherein said communication network includes mobile terminal equipment communicable with a public switched network, a stationary radio station for establishing a radio channel to said mobile terminal equipment, and the voice communication as audible telephonic conversation signals to said mobile terminal equipment on the radio channel, said mobile terminal equipment including:

receiving means for responding to a call over the radio channel from the stationary radio station and receiving the conversation signals when said switching means is in said first mode and the non-vocal data when said switching means is in said second mode, said non-vocal data consisting essentially of signals representative of discrete alphanumeric character codes, display means for visually displaying the alphanumeric characters included in the information received;

a telephone speech circuit for transducing the received conversation signals into corresponding audible sound;

control means operative in response to the data input unit and the switching means for controlling said receiving means, said display means and said telephone speech circuit to cause, when said receiving means receives the information, said display means to display respective alphanumeric characters represented by corresponding ones of the discrete alphanumeric character codes included in the received information.

22. The terminal in accordance with claim 20, further comprising storing means for storing the information received;

said switch means being adapted to set a condition in which said mobile terminal equipment is not allowed to send the voice communication signals over the radio channel to the stationary radio station but stores the signals representing the discrete alphanumeric character codes included in the received information into said storing means.

23. Mobile terminal equipment communicable with a public switched network, which includes a stationary radio station for establishing a radio channel to said mobile terminal equipment and switches information including discrete alphanumeric character codes, and audible telephonic conversation signals to said mobile terminal equipment on the radio channel, comprising:

receiving means for responding to a call over the radio channel from the stationary radio station and receiving the discrete alphanumeric character codes included in the information, and the conversation signals, over the radio channel from the stationary radio station;

display means for visually displaying the alphanumeric characters included in the information received;

a telephone speech circuit for transducing the received conversation signals into corresponding audible sound, and capturing voice and transducing the captured voice into corresponding conversation signals;

first input means manually operable for setting a first condition in which said mobile terminal equipment is not allowed to effect audible, telephonic conversation over the radio channel to the stationary radio station;

control means operative in response to said first input means for controlling said receiving means, said display means and said telephone speech circuit to cause, when said receiving means receives the information, said display means to display respective alphanumeric characters represented by corresponding ones of the discrete alphanumeric character codes included in the received information;

said control means producing a first status signal when said mobile terminal equipment is set to the first condition;

transmitter means for transmitting the first status signal produced to the stationary radio station over the radio channel, upon receiving a call from the stationary radio station while said mobile terminal equipment is in the first condition;

said control means disabling said telephone speech circuit while said mobile terminal equipment is in the first condition; and second input means manually operable for manually entering discrete alphanumeric character codes to be transmitted through the stationary radio station over the radio channel to the public switched network;

said first input means being adapted to set a third condition in which said mobile terminal equipment is not allowed to effect audible, telephonic conversation but to transmit the discrete alphanumeric character codes entered by said second input means over the radio channel to the stationary radio station;

said control means being responsive to the third condition set by said first input means to produce a third status signal;

said transmitter means transmitting the third status signal produced to the stationary radio station over the radio channel, upon receiving a call from the stationary radio station of the public switched network while said mobile terminal equipment is in the third condition;

said control means disabling said telephone speech circuit while said mobile terminal equipment is in the third condition.

* * * * *